United States Patent
Yao et al.

(10) Patent No.: US 10,681,659 B2
(45) Date of Patent: Jun. 9, 2020

(54) SYNCHRONIZATION SYSTEM AND COMMUNICATION DEVICE

(71) Applicant: Oki Electric Industry Co., Ltd., Tokyo (JP)

(72) Inventors: Taketsugu Yao, Tokyo (JP); Hiroshi Nishimura, Tokyo (JP); Kota Tsuchie, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 218 days.

(21) Appl. No.: 16/008,129

(22) Filed: Jun. 14, 2018

(65) Prior Publication Data

US 2019/0028988 A1 Jan. 24, 2019

(30) Foreign Application Priority Data

Jul. 19, 2017 (JP) ................................. 2017-139929

(51) Int. Cl.
| | |
|---|---|
| H04W 56/00 | (2009.01) |
| H04L 9/32 | (2006.01) |
| H04W 12/06 | (2009.01) |
| H04L 29/06 | (2006.01) |
| H04W 12/02 | (2009.01) |
| H04L 9/12 | (2006.01) |

(52) U.S. Cl.
CPC ........... *H04W 56/0015* (2013.01); *H04L 9/12* (2013.01); *H04L 9/3271* (2013.01); *H04L 63/0428* (2013.01); *H04L 63/08* (2013.01); *H04W 12/02* (2013.01); *H04W 12/06* (2013.01); *H04L 63/162* (2013.01); *H04L 2209/80* (2013.01)

(58) Field of Classification Search
CPC .................................................. H04W 56/0015
See application file for complete search history.

(56) References Cited

U.S. PATENT DOCUMENTS

| | | | |
|---|---|---|---|
| 8,023,976 B2* | 9/2011 | Shao | H04W 56/0015 455/502 |
| 2004/0052241 A1* | 3/2004 | Martin | G01S 5/0252 370/351 |

(Continued)

FOREIGN PATENT DOCUMENTS

JP 2012-199820 A 10/2012

*Primary Examiner* — Simon P Kanaan
(74) *Attorney, Agent, or Firm* — Rabin & Berdo, P.C.

(57) ABSTRACT

It takes a processing time to perform a security process on a time synchronization message, thus the difference of a delay time required for the security process can be made between a time at which the time synchronization message is actually transmitted and a transmission time assigned to the time synchronization message, and therefore, the difference between the actual transmission time of the time synchronization message and the assigned transmission time needs to be reduced. In generation of a secure time synchronization message in the synchronization system according to embodiments of the present invention, most of the security processes is performed in an upper layer which is an MAC layer or a higher layer, and processes including the assignment of the transmission time and assignment of authentication information for authenticating validity of the transmission time are performed in a physical layer.

19 Claims, 8 Drawing Sheets

(56) References Cited

U.S. PATENT DOCUMENTS

| | | | | |
|---|---|---|---|---|
| 2007/0159301 A1* | 7/2007 | Hirt | ....................... | H04W 12/04 |
| | | | | 340/10.1 |
| 2008/0068217 A1* | 3/2008 | Van Wyk | .............. | H04W 40/22 |
| | | | | 340/870.11 |
| 2014/0040985 A1* | 2/2014 | Wang | ................ | H04W 12/0609 |
| | | | | 726/3 |
| 2016/0337783 A1* | 11/2016 | Seok | ..................... | H04L 1/1829 |
| 2018/0004964 A1* | 1/2018 | Litichever | ............... | H04L 63/08 |

\* cited by examiner

10

SYNCHRONIZATION SYSTEM AND COMMUNICATION DEVICE

CROSS REFERENCE TO RELATED APPLICATION(S)

This application is based upon and claims benefit of priority from Japanese Patent Application No. 2017-139929, filed on Jul. 19, 2017, the entire contents of which are incorporated herein by reference.

BACKGROUND

The present invention relates to a synchronization system and a communication device. This invention can be applied to a synchronization system in which, for example, a plurality of communication devices exchange time synchronization messages to which a security process has been applied via a network to establish time synchronization among the plurality of communication devices.

In order to establish secure and precise time synchronization, it is desirable to assign time information acquired in a physical layer to a time synchronization message immediately before transmission of the time synchronization message and then apply a security process of, for example, an authentication code, a digital signature, or the like to the time synchronization message.

However, since a delay time (e.g., a time required for the security process) taken due to the application of the security process to the time synchronization message is needed, there is a problem of the difference corresponding to the delay time required for the security process arising between a time at which the transmission of the time synchronization message is actually performed and a transmission time assigned to the time synchronization message.

As a method for solving the above-described problem, there is the technology disclosed in JP 2012-199820A. JP 2012-199820A discloses a method in which a plurality of transmission times are predicted in an upper layer in advance, a plurality of secure time synchronization messages to which each of the predicted transmission times is assigned are prepared, and when a time synchronization message is actually transmitted in a physical layer, a time synchronization message to which a predicted transmission time having the minimum difference from the actual transmission time is assigned is selected and transmitted.

SUMMARY

However, since the above-described conventional method is based on the premise that a plurality of secure time synchronization messages to which each of predicted transmission times is assigned are prepared, there may be a problem that a processing load increases and a memory capacity for storing the plurality of time synchronization messages increases as well.

Therefore, the present invention takes the above-described problem into consideration and aims to provide a system in which most of a security process is performed in an upper layer (e.g., an upper layer which is a media access control (MAC) layer or a higher layer) to generate a secure time synchronization message, a process including assignment of a transmission time and assignment of authentication information (which will also be referred to as an "authentication tag" below) for authenticating the validity of the transmission time is performed in a physical layer, and thereby the difference between a time at which the transmission of the time synchronization message is actually performed and the transmission time assigned to the time synchronization message is reduced.

To solve the above-described problems, a first embodiment of the present invention provides a synchronization system in which a first communication device and a second communication device exchange time synchronization messages and the first communication device establishes synchronization with a time of the second communication device. The first communication device includes a request message security processing unit configured to encrypt a request message including request proof information for proving validity of a request transmission time, and a secure request message generation unit configured to generate and transmit a time synchronization request message obtained by assigning a request transmission time and request authentication information for authenticating the request transmission time to the encrypted request message. The second communication device includes a request reception time acquisition unit configured to acquire a request reception time of the received time synchronization request message in a physical layer, a request message authentication unit configured to authenticate the request proof information obtained by decrypting the encrypted request message that is extracted from the received time synchronization request message, a request transmission time authentication unit configured to authenticate the request transmission time included in the time synchronization request message by checking whether authentication information generated on a basis of the authenticated request proof information and the request transmission time included in the time synchronization request message matches the request authentication information included in the time synchronization request message, a response message security processing unit configured to perform an encryption-authentication process on a response message including the request reception time and response proof information for proving validity of a time included in the response message, and a secure response message generation unit configured to generate and transmit a time synchronization response message obtained by assigning a response transmission time and response authentication information for authenticating validity of the response transmission time to the response message that has undergone the encryption-authentication process. The first communication device further includes a response reception time acquisition unit configured to acquire a response reception time of the received time synchronization response message in a physical layer, a response message authentication unit configured to authenticate the response proof information obtained by decrypting the response message that has undergone the encryption-authentication process and that has been extracted from the received time synchronization response message, a response transmission time authentication unit configured to authenticate the response transmission time included in the time synchronization response message by checking whether authentication information generated on a basis of the authenticated response proof information and the response transmission time included in the time synchronization response message matches the response authentication information included in the time synchronization response message, and a time synchronization unit configured to establish synchronization with the time of the second communication device on a basis of the request transmission time, the request reception time, the response transmission time, and the response reception time.

A second embodiment of the present invention provides a communication device that establishes synchronization with a time of a second communication device by transmitting a time synchronization message to the second communication device, the communication device including: a request message security processing unit configured to encrypt a request message including request proof information for proving validity of a request transmission time; a secure request message generation unit configured to generate and transmit a time synchronization request message obtained by assigning the request transmission time and request authentication information for authenticating the request transmission time to the encrypted request message; a response reception time acquisition unit configured to acquire a response reception time of a time synchronization response message received from the second communication device in a physical layer; a response message authentication unit configured to authenticate response proof information obtained by decrypting a response message that has undergone an encryption-authentication process and that has been extracted from the received time synchronization response message; a response transmission time authentication unit configured to authenticate a response transmission time included in the time synchronization response message by checking whether authentication information generated on a basis of the authenticated response proof information and the response transmission time included in the time synchronization response message matches response authentication information included in the time synchronization response message; and a time synchronization unit configured to establish synchronization with the time of the second communication device on a basis of the request transmission time, a request reception time, the response transmission time, and the response reception time.

A third embodiment of the present invention provides a communication device that transmits a time synchronization response message to a first communication device, in response to a time synchronization request message from the first communication device, the communication device including: a request reception time acquisition unit configured to acquire a request reception time of the time synchronization request message received from the first communication device in a physical layer, a request message authentication unit configured to authenticate request proof information obtained by decrypting an encrypted request message extracted from the received time synchronization request message; a request transmission time authentication unit configured to authenticate a request transmission time included in the time synchronization request message by checking whether authentication information generated on a basis of the authenticated request proof information and the request transmission time included in the time synchronization request message matches request authentication information included in the time synchronization request message; a response message security processing unit configured to perform an encryption-authentication process on a response message including the request reception time and response proof information for proving validity of a time included in the response message; and a secure response message generation unit configured to generate and transmit the time synchronization response message obtained by assigning a response transmission time and response authentication information for authenticating the response transmission time to the response message that has undergone the encryption-authentication process.

According to the present invention, in generation of a secure time synchronization message, most of a security process is performed in an upper layer, a process including assignment of a transmission time and assignment of authentication information of the assigned transmission time is performed in a physical layer, and thereby a difference between a time at which the transmission of the time synchronization message is actually performed and the transmission time assigned to the time synchronization message can be reduced.

DETAILED DESCRIPTION OF THE EMBODIMENT(S)

Figure 1:
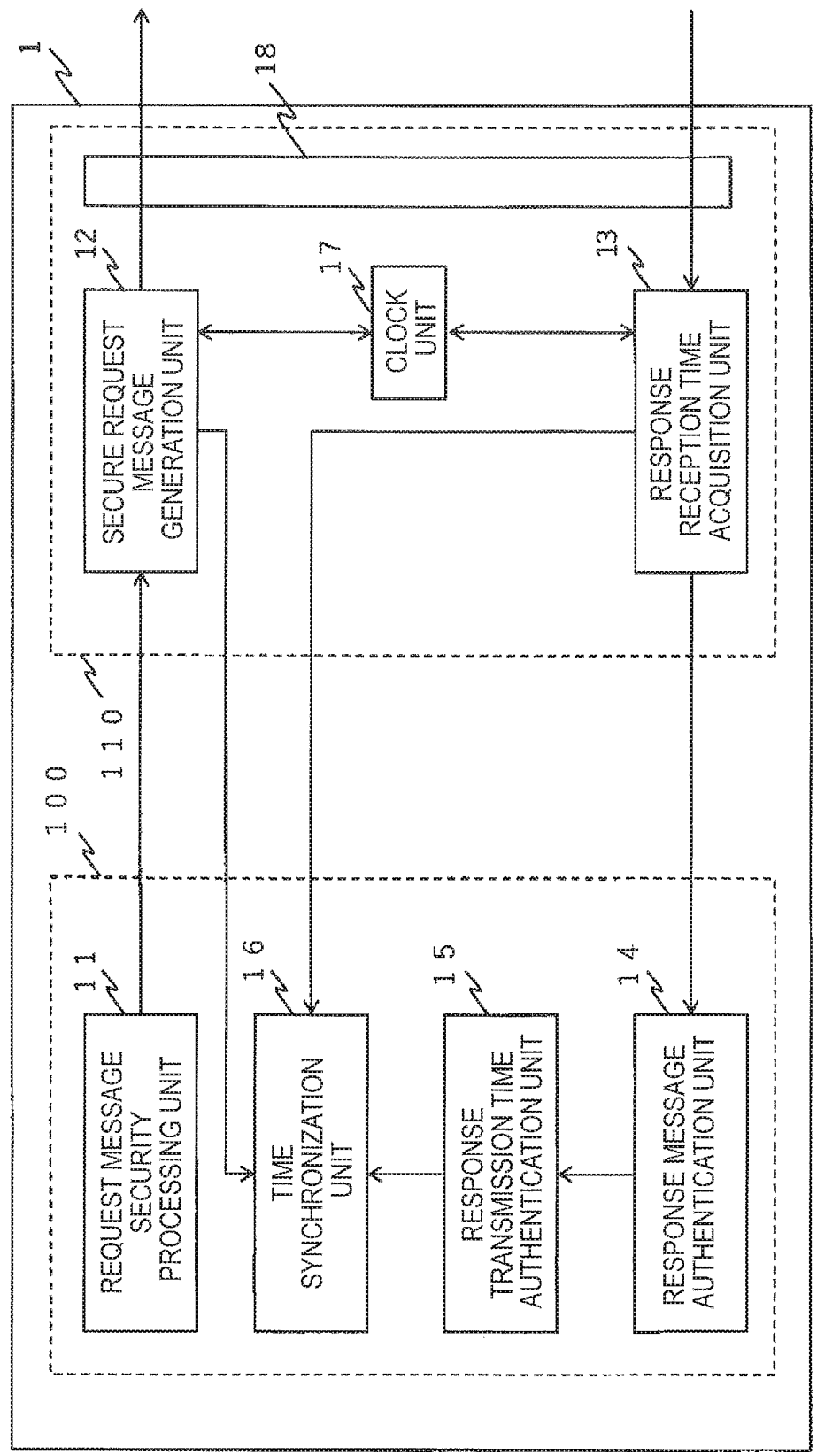
FIG. 1 is an internal configuration diagram illustrating an internal configuration of a communication device serving as a client according to an embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) Basic Concept

A network time protocol (NTP) is known as a protocol by which a plurality of communication devices transmit and receive communication frames (which will also be referred to as communication frames and "time synchronization messages" exchanged for time synchronization below) to and from each other via a network to establish time synchronization between the communication devices.

Figure 2:
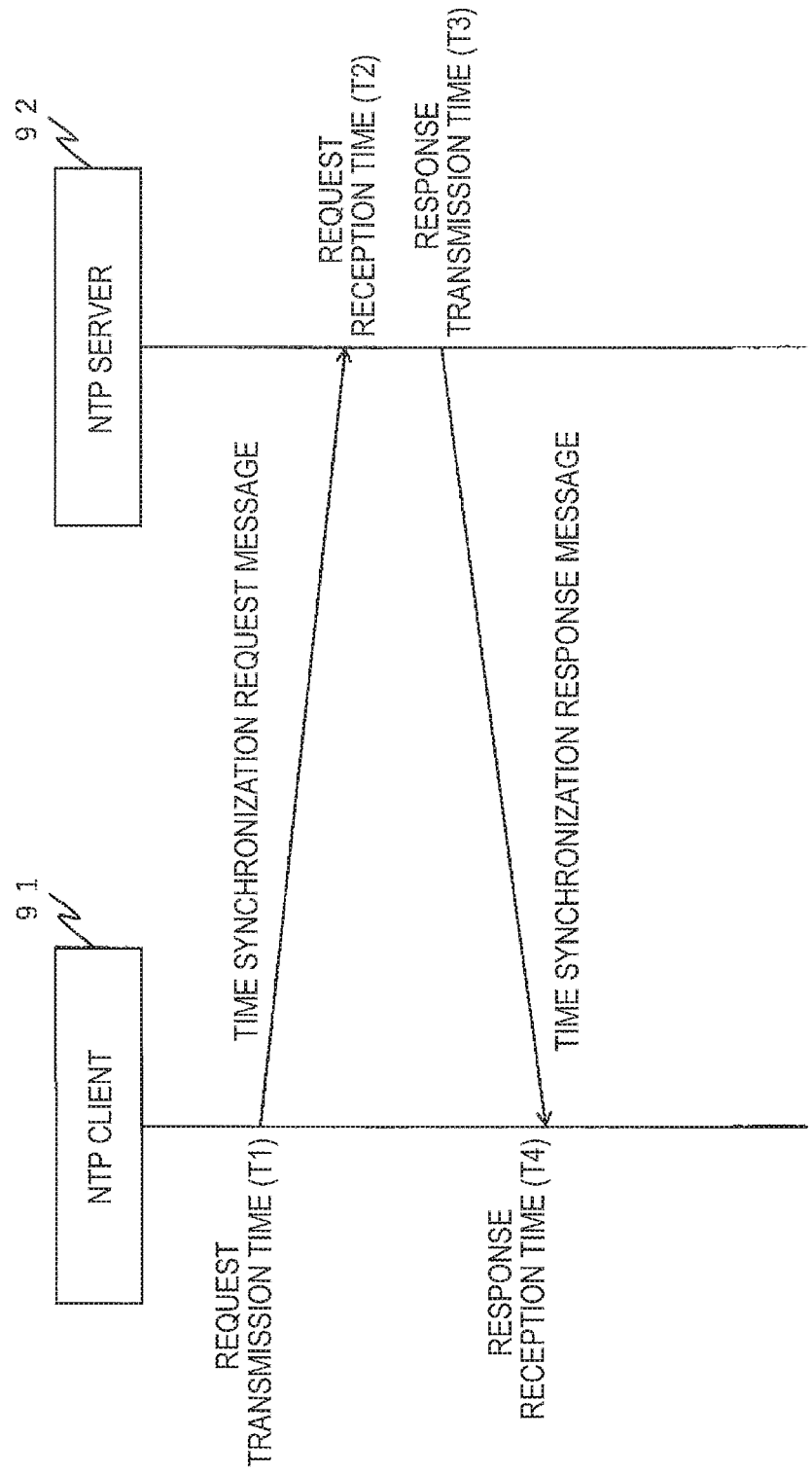
FIG. 2 is an explanatory diagram for describing a mechanism of an NTP.

FIG. 2 is an explanatory diagram for describing a mechanism of a conventional NTP. Under the NTP, an NTP client 91 transmits a time synchronization request message to which a request transmission time (T1) is assigned, to an NTP server 92, and the NTP server 92 replies to the NTP client 91 with a time synchronization response message to which the request transmission time (T1), a request reception time (T2), and a response transmission time (T3) are assigned.

When a response reception time (T4) of the time synchronization response message for the NTP client 91 is set, a round-trip transmission time of the time synchronization messages exchanged via the network can be expressed as (T4−T1)−(T3−T2), and a delay time of the NTP client 91 with respect to the NTP server can be expressed as {(T3+T2)−(T1+T4)}/2. By exchanging the time synchronization messages in a round trip as described above, the NTP client 91 can calculate a delay time with respect to time of a clock of the NTP server 92, and thus time of a clock of the NTP client 91 (own device) can be corrected using the delay time.

Meanwhile, there is a possibility of an incorrect time synchronization message being input or a time synchronization message or time information being falsified by an ill-intentioned third party. In this case, time of the clock (clock function) of a communication device is out of order. In order to prevent such improprieties, a security process of assigning an authentication code or a digital signature to a time synchronization message or the like is generally applied.

In a case in which time synchronization is securely established between communication devices forming a wireless network, it is preferable to assign time information acquired in a physical layer to a time synchronization message immediately before transmission thereof in order to improve synchronization precision.

The reason for this is that it is difficult to ascertain use statuses of wireless communication channels in an upper layer (e.g., an upper layer which is a media access control (MAC) layer or a higher layer). Thus, in a case in which time information is assigned to a time synchronization message in an upper layer, a difference is made between a time at which a time synchronization message is actually transmitted in the physical layer and a time assigned in the upper layer, and thus precision in time synchronization may be lowered. In addition, in a case in which time synchronization is established between battery-driven power-saving communication devices forming a wireless sensor network, each of the communication devices intermittently operates, and thus there can be a problem in terms of synchronization precision. Under the NTP illustrated in FIG. 2, the transmission time on the outbound route and the transmission time on the inbound route are assumed to be the same in order to enable the NTP client 91 to calculate the delay time. However, an intermittently operating communication device awakens a communication partner at timings of intermittent periods of the communication partner and transmits communication frames to the communication partner, and thus a time taken for transmission on the outbound route and a time taken for transmission on the inbound route will not be the same. Thus, in a case in which a transmission time is assigned to a time synchronization message in an upper layer, a difference is made between the time taken for transmission on the outbound route and the time taken for transmission on the inbound route, resulting in low precision in time synchronization.

As described above, in order to establish secure and highly precise time synchronization, it is desirable to assign time information to a time synchronization message immediately before transmission thereof in the physical layer and then assign an authentication code or a digital signature to the time synchronization message. In this case, however, there is a problem that a difference of a time required for the security process is made between a time at which the time synchronization message is actually transmitted and a transmission time given to the time synchronization message.

The present invention provides a system that can ensure security in a time synchronization process and improvement in precision of time synchronization by reducing a processing delay by applying a security process to time synchronization messages in a time synchronization process for communication devices transmitting and receiving communication frames via a network.

That is, the present invention is for executing most of a security process in an upper layer (an upper layer which is an MAC layer or a higher layer) when a secure time synchronization message is generated and executing a process including assignment of a transmission time and assignment of an authentication tag for authenticating the validity of the assigned transmission time in the physical layer. Accordingly, a difference (differential) between a time at which the time synchronization message is actually transmitted and the transmission time assigned to the time synchronization message can be reduced.

(B) Main Embodiment

An embodiment of a synchronization system, a communication device, a server, a synchronization program, and a synchronization method according to the present invention will be descried below in detail with reference to the drawings.

(B-1) Configuration of Embodiment (B-1-1) Overall Configuration

Figure 3:
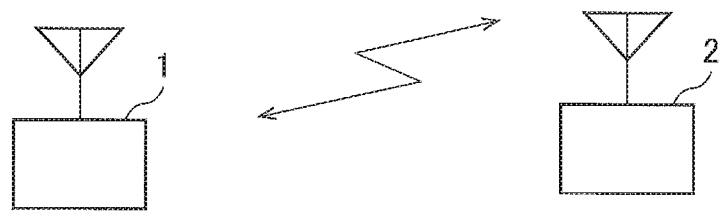
FIG. 3 is an overall configuration diagram illustrating an overall configuration of a synchronization system according to an embodiment.

FIG. 3 is an overall configuration diagram illustrating an overall configuration of a synchronization system (a secure time synchronization system) according to an embodiment.

As illustrated in FIG. 3, the synchronization system 10 according to the embodiment includes a communication device 1 serving as a client and a communication device 2 serving as a server, and the communication device 1 and the communication device 2 can transmit and receive communication frames to and from each other through wireless communication.

In addition, when time synchronization is to be established, the communication device 1 serving as a client wirelessly transmits a secure time synchronization request message including a request transmission time to the communication device 2 serving as a server, and upon receiving the message, the communication device 2 serving as a server replies to the communication device 1 serving as a client with a secure time synchronization response message including at least a request reception time and a response transmission time. Accordingly, the communication device 1 serving as a client calculates a time deviation from a time of the communication device 2 serving as a server to a correct time of a clock of the own device to establish time synchronization.

The wireless communication protocol is not particularly limited, and a wireless LAN-related technology (e.g., a technology standardized by the IEEE 802.11 task group), a short range wireless communication technology (e.g., a technology based on the IEEE 802.15.4 standard), or the like can be widely applied. Note that the technology is not limited to the case in which the communication device 1 is present within the radio wave arrival range of the communication device 2 and the communication device 1 performs direct wireless communication to the communication device 2, and can also be applied to a case in which the communication device 1 performs wireless communication with the communication device 2 via another communication device as in multi-hop wireless communication or the like. Furthermore, although the case in which wireless communication is performed is exemplified in the embodiment, the technology can also be applied to a wired communication system.

Although the case in which the one communication device 1 makes the time synchronization request with respect to the communication device 2 is exemplified in the embodiment, the technology can also be applied to a case in which a plurality of communication devices 1 make time synchronization requests with respect to one communication device 2.

(B-1-2) Internal Configuration of Communication Device 1

FIG. 1 is an internal configuration diagram illustrating an internal configuration of the communication device 1 serving as a client according to an embodiment.

The communication device 1 serving as a client includes a request message security processing unit 11, a secure request message generation unit 12, a response reception time acquisition unit 13, a response message authentication unit 14, a response transmission time authentication unit 15, a time synchronization unit 16, a clock unit 17, and a communication unit 18 in FIG. 1.

The communication device 1 performs packet transmission using communication layers including a PHY layer (physical layer) and an upper layer which is a media access control (MAC) layer or a higher layer prescribed in the OSI reference model. In this embodiment, in general, the request message security processing unit 11, the response message authentication unit 14, the response transmission time authentication unit 15, and the time synchronization unit 16 are positioned in an upper layer (an upper layer which is the MAC layer or a higher layer) 100, and the secure request message generation unit 12, the response reception time acquisition unit 13, the clock unit 17, and the communication unit 18 are positioned in a physical layer 110.

Note that, although a hardware configuration of the communication device 1 is not illustrated, the communication device 1 includes, for example, a CPU, a ROM, a RAM, an EEPROM, an input/output interface, and the like, and various functions of the communication device 1 are realized when the CPU executes processing programs (e.g., a synchronization program and the like) stored in the ROM. In addition, the processing programs (e.g., the synchronization program and the like) can be exhibited by causing a computer to function as each of the function blocks exemplified in FIG. 1.

[Request Message Security Processing Unit 11]

The request message security processing unit 11 generates a request message including request proof information used to prove to the communication device 2 serving as a server that a request transmission time of a time synchronization request message is correct and encrypts the request message.

Although the encryption method is not particularly limited, the communication device 1 may encrypt the request message by using a block cipher of the Advanced Encryption Standard (AES) or the like by using a common key shared with the communication device 2 serving as a server. In addition to the encryption, the request message security processing unit 11 may generate an authentication code for authenticating the request message, add the authentication code to the request message, and then encrypt the request message. Accordingly, not only can the integrity of the request message be protected but also the confidentiality of the request message can be ensured. In addition, a temporary key generated from the common key may be used in the encryption process. The temporary key may be, for example, an output value of a one-way function that receives the common key and additional information including random number information, an address, and the like as an input. In this case, the communication device 2 serving as a server may be allowed to calculate a temporary key by causing the additional information including the random number information, the address, or the like to be included in the request message as plain text.

The request proof information is information for proving to the communication device 2 serving as a server that the request transmission time of the time synchronization request message is correct. That is, the request transmission time can be confirmed to be correct in a case in which the communication device 2 that has received the time synchronization request message can correctly authenticate the request proof information included in the time synchronization request message. The request proof information may be, for example, a random number generated by the communication device 1. In addition, the request proof information may be, for example, an authentication code generated with respect to an arbitrary bit string. The encrypted request proof information can be prevented from being leaked to a third party having no decryption key.

The request message security processing unit 11 sends the encrypted request message and the request proof information assigned to the request message, to the secure request message generation unit 12. The reason that the request message security processing unit 11 sends the request proof information to the secure request message generation unit 12 is that a request authentication tag is generated by using the request proof information and the request transmission time as will be described below. In other words, the request message security processing unit 11 sends the request proof information to the secure request message generation unit 12 to cause generation of the request authentication tag.

[Secure Request Message Generation Unit 12]

The secure request message generation unit 12 generates a time synchronization request message by assigning the request transmission time and the request authentication tag to the encrypted request message sent from the request message security processing unit 11.

The request transmission time is a time acquired immediately before the time synchronization request message is transmitted in the physical layer 110 (the clock unit 17). By setting the time immediately before the transmission of the time synchronization request message in the physical layer 110 to the request transmission time, a difference with an actual transmission time can be reduced.

The request authentication tag (which will also be referred to as "request authentication information") is information for authenticating that the request transmission time included in the time synchronization request message is a correct time. The request authentication tag is information generated using the request proof information sent from the request message security processing unit 11 and the request transmission time assigned to the time synchronization request message. That is, the request authentication tag is data for causing the communication device 2 serving as a server to authenticate that the request transmission time assigned to the time synchronization request message received by the communication device 2 is a correct time, not an incorrect time such as a falsified one. In other words, the request authentication tag is information for causing the communication device 2 to authenticate validity of the request transmission time.

Although the method for generating the request authentication tag is not particularly limited, for example, an output value of a one-way function that receives the request proof information and the request transmission time as an input can be used. Since the process is one executed after the request transmission time is acquired in the physical layer 110, the process is assumed to be a light process.

As described above, the request transmission time is acquired in the physical layer 110 immediately before the transmission of the time synchronization request message, and immediately thereafter, the generation of the request authentication tag is executed. By relatively lowering a processing load imposed on the generation of the request authentication tag, a processing time can be shortened. In addition, by performing the generation of the request authentication tag for authenticating the validity of the request transmission time in the physical layer 110, the difference between the time at which the time synchronization message is actually transmitted and the request transmission time assigned to the time synchronization message can be reduced.

The secure request message generation unit 12 transmits the generated time synchronization request message to the communication device 2 serving as a server. In addition, the secure request message generation unit 12 sends the acquired request transmission time to the time synchronization unit 16 in order to calculate a delay time with respect to the communication device 2 serving as a server.

[Response Reception Time Acquisition Unit 13]

The response reception time acquisition unit 13 acquires a reception time assigned to a time synchronization response message received from the communication device 2 serving as a server in the physical layer 110. The response reception time acquisition unit 13 sends the reception time acquired in the physical layer 110 to the time synchronization unit 16 as a response reception time and sends the received time synchronization response message to the response message authentication unit 14.

[Response Message Authentication Unit 14]

The response message authentication unit 14 extracts an encrypted and authenticated response message from the time synchronization response message sent from the response reception time acquisition unit 13, decrypts and authenticates the encrypted and authenticated response message, and thereby acquires the request transmission time, request reception time, and response proof information that have been successfully authenticated.

Although the decryption/authentication methods are not particularly limited, a decryption/authentication process that can cancel the encryption-authentication process performed by the communication device 2 serving as a server using a common key shared with the communication device 2 serving as a server may be performed. In addition, a temporary key generated from the common key may be used in the decryption-authentication process. The temporary key may be, for example, an output value of a one-way function that receives the common key and additional information including random number information, an address, and the like as an input. In this case, as the additional information including random number information, an address, or the like, information included in the response message may be used. In addition, the response message authentication unit 14 may apply challenge-response authentication to check whether the sent time synchronization response message is a response to the time synchronization request message generated by the secure request message generation unit 12. In this case, the authentication may be performed by checking whether the successfully authenticated request transmission time matches the request transmission time assigned by the secure request message generation unit 12. Note that details of the request reception time and the response proof information will be described in detailed description of an internal configuration of the communication device 2 serving as a server.

The response message authentication unit 14 extracts the response transmission time and a response authentication tag from the time synchronization response message and sends the response transmission time, the response authentication tag, and the successfully authenticated request reception time to the response transmission time authentication unit 15 along with the response proof information.

[Response Transmission Time Authentication Unit 15]

The response transmission time authentication unit 15 authenticates that the transmission time assigned to the time synchronization response message is not an incorrect time manipulated by an attacker. The response transmission time authentication unit 15 checks whether an authentication tag generated from the response transmission time and the response proof information sent from the response message authentication unit 14 matches the response authentication tag also sent from the response message authentication unit 14, and authenticates that the response transmission time is correct information when the tags match. The response transmission time authentication unit 15 sends the successfully authenticated response transmission time to the time synchronization unit 16 along with the request reception time sent from the response message authentication unit 14.

[Time Synchronization Unit 16]

The time synchronization unit 16 calculates a time deviation (i.e., a time difference from a clock of the communication device 2) from time of the communication device 2 serving as a server to establish time synchronization. To calculate the time deviation, the request transmission time sent from the secure request message generation unit 12, the response reception time sent from the response reception time acquisition unit 13, and the request reception time and the response transmission time sent from the response transmission time authentication unit 15 are used. That is, in a case in which the request transmission time (T1), the response reception time (T4), the request reception time (T2), and the response transmission time (T3) are set, a transmission time δ (communication delay time) of a round trip of the time synchronization messages is expressed by δ=(T4−T1)−(T3−T2). This expression is obtained by subtracting the processing time of the communication device 2 serving as a server from the transmission time of the round trip of the time synchronization messages. A delay time Θ of the clock of the communication device 1 serving as a client is expressed by Θ={(T3+T2)−(T1+T4)}/2. Since the delay time Θ is the time deviation, the time synchronization unit 16 corrects the time of the own clock by using the delay time Θ.

(B-1-3) Internal Configuration of Communication Device 2

Figure 4:
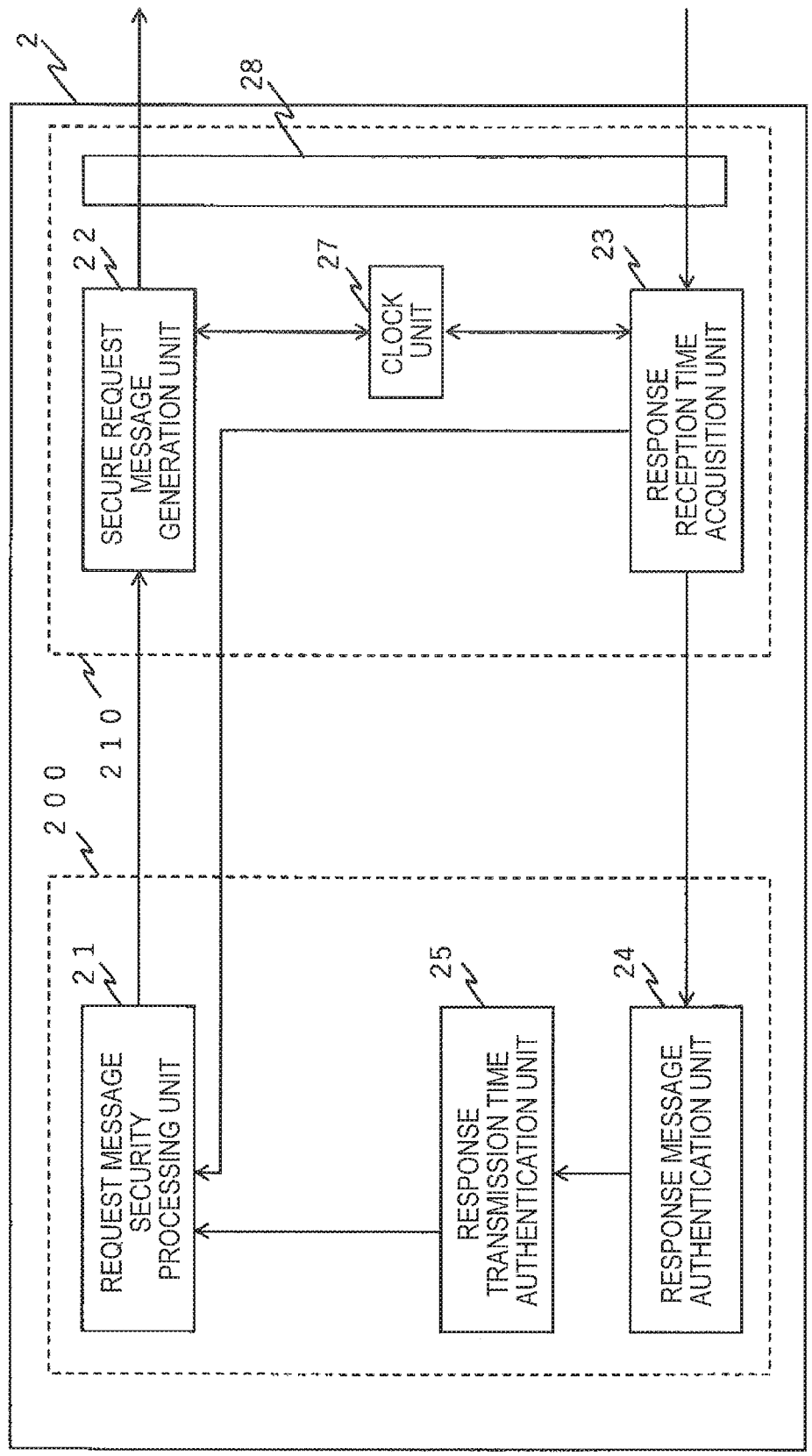
FIG. 4 is an internal configuration diagram illustrating an internal configuration of a communication device serving as a server according to an embodiment.

FIG. 4 is an internal configuration diagram illustrating an internal configuration of the communication device 2 serving as a server according to an embodiment.

The communication device 2 includes a request reception time acquisition unit 23, a request message authentication unit 24, a request transmission time authentication unit 25, a response message security processing unit 21, a secure response message generation unit 22, a clock unit 27, and a communication unit 28 as illustrated in FIG. 4.

The communication device 2 performs packet transmission using communication layers including a PHY layer (physical layer) and an upper layer which is a media access control (MAC) layer or a higher layer prescribed in the OSI reference model. In this embodiment, in general, the response message security processing unit 21, the request message authentication unit 24, and the request transmission time authentication unit 25 are positioned in an upper layer (e.g., an upper layer which is the MAC layer or a higher layer) 200, and the secure response message generation unit 22, the request reception time acquisition unit 23, the clock unit 27, and the communication unit 28 are positioned in a physical layer 210.

Note that, although a hardware configuration of the communication device 2 is not illustrated, for example, the communication device 2 includes a CPU, a ROM, a RAM, an EEPROM, an input/output interface, and the like, and various functions of the communication device 2 are realized when the CPU executes processing programs (e.g., a synchronization program and the like) stored in the ROM. In addition, the processing programs (e.g., the synchronization program and the like) can be exhibited by causing a computer to function as the function blocks exemplified in FIG. 4.

[Request Reception Time Acquisition Unit 23]

The request reception time acquisition unit 23 acquires a reception time of a time synchronization request message received from the communication device 1 serving as a client in the physical layer. The request reception time acquisition unit 23 sends the received time synchronization request message to the request message authentication unit 24. In addition, the request reception time acquisition unit 23 sends the acquired reception time as a request reception time to the response message security processing unit 21.

[Request Message Authentication Unit 24]

The request message authentication unit 24 extracts an encrypted request message from the time synchronization request message sent from the request reception time acquisition unit 23, decrypts the encrypted request message, and thereby acquires request proof information.

Although the decryption method is not particularly limited, a decryption process that can cancel the encryption process performed by the communication device 1 serving as a client may be executed using the common key shared with the communication device 1. In addition, a temporary key generated from the common key may be used in the decryption process. The temporary key may be, for example, an output value of a one-way function that receives the common key and additional information including random number information, an address, and the like as an input. In this case, information included in the request message may be used as the additional information including random number information, an address, or the like.

The request message authentication unit 24 extracts a request transmission time and a request authentication tag from the time synchronization request message and sends the request transmission time, the request authentication tag, and the acquired request proof information to the request transmission time authentication unit 25.

[Request Transmission Time Authentication Unit 25]

The request transmission time authentication unit 25 authenticates that the transmission time assigned to the time synchronization request message is not an incorrect time manipulated by an attacker. The request transmission time authentication unit 25 checks whether an authentication tag generated from the request proof information and the request transmission time sent from the request message authentication unit 24 matches the request authentication tag also sent from the request message authentication unit 24, and authenticates that the request transmission time is correct information when the tags match. The request transmission time authentication unit 25 sends the successfully authenticated request transmission time to the response message security processing unit 21.

As the method for generating the authentication tag, the same method as the generation method of the request authentication tag used by the secure request message generation unit 12 can be used, and for example, an output value of a one-way function that receives the request proof information and the request transmission time as an input can be used. Since the present process is performed after the request transmission time is acquired in the physical layer 210, the process is assumed to be a light process. Accordingly, a processing load imposed on the matching determination for the request authentication tag and the separately generated authentication tag (a determination process of the request authentication tag) can be reduced, and further a processing time thereof can be shortened.

[Response Message Security Processing Unit 21]

The response message security processing unit 21 generates a response message including response proof information for proving to the communication device 1 that the request reception time of the time synchronization request message from the request reception time acquisition unit 23 and the request transmission time assigned to a time synchronization response message are correct times, and performs an encryption-authentication process on the generated response message.

In addition, the response message may include the request transmission time to perform challenge-response authentication to authenticate the generated response message as a response to the time synchronization request message received from the communication device 1 serving as a client. Although the encryption-authentication method is not particularly limited, the encryption-authentication may be performed by using a block cipher such as the AES or the like using the common key shared with the communication device serving as a client.

The response proof information is for proving to the communication device 1 serving as a client that a response transmission time of the time synchronization response message is correct. That is, in a case in which the communication device 1 that has received the time synchronization response message can correctly authenticate the response proof information included in the time synchronization response message, the response transmission time can be authenticated as being correct. The response proof information may be, for example, a random number generated by the communication device 2. In addition, the information may be, for example, an authentication code generated with respect to an arbitrary bit string. For example, an authentication code before encryption generated in the course of the encryption-authentication process may be used. By being encrypted, the response proof information can be prevented from being leaked to a third party having no decryption key. In addition, a temporary key generated from the common key may be used in the encryption-authentication process. The temporary key may be, for example, an output value of a one-way function that receives the common key and information such as the random number information or an address, as an input. In this case, the communication device 1 serving as a client may be allowed to calculate a temporary key by causing the additional information including the random number information, the address, or the like to be included in the response message as plain text.

The response message security processing unit 21 sends the response message that has undergone the encryption-authentication process and the response proof information included in the response message to the secure response message generation unit 22.

[Secure Response Message Generation Unit 22]

The secure response message generation unit 22 assigns the response transmission time and the response authentication tag to the response message that has been sent from the response message security processing unit 21 and that has undergone the encryption-authentication process, and generates the time synchronization response message.

The response transmission time is time acquired in the physical layer 210 immediately before the time synchronization response message is transmitted.

The response authentication tag (which will also be referred to as "response authentication information") is information generated using the response transmission time and the response proof information sent from the response message security processing unit 21. Although a generation method of the response authentication tag is not particularly limited, for example, an output value of a one-way function that receives the response proof information and the response transmission time as an input can be used. Since this process is performed after the response transmission time is acquired in the physical layer 210, the process is assumed to be a light process.

The secure response message generation unit 22 transmits the generated time synchronization response message to the communication device 1 serving as a client.

(B-2) Operation According to Embodiment

Next, an operation of a synchronization process performed in the synchronization system (secure time synchronization system) 10 according to an embodiment will be described with reference to FIG. 5 and FIG. 6.

Figure 5:
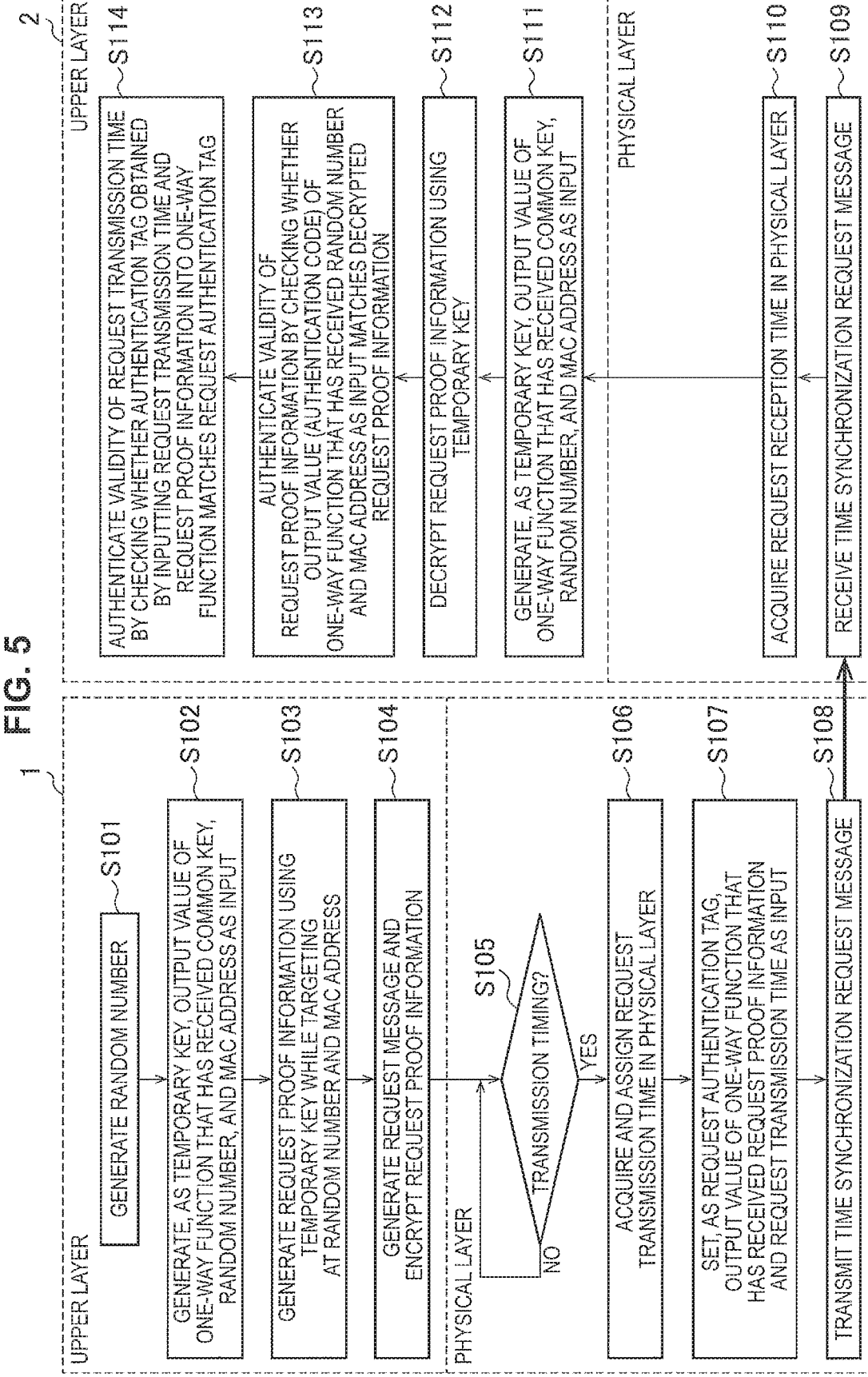
FIG. 5 is a flowchart illustrating a process relating to a time synchronization request made by a communication device serving as a client with respect to a communication device serving as a server according to an embodiment.

FIG. 5 is a flowchart illustrating a process relating to a time synchronization request made by the communication device 1 with respect to the communication device 2 according to the embodiment. FIG. 6 is a flowchart illustrating a process relating to a response to the time synchronization request made by the communication device 1 according to the embodiment. Note that the processes illustrated in FIG. 5 and FIG. 6 are examples of the synchronization process of the synchronization system 10 according to the embodiment.

S101 to S104 in FIG. 5 represent a process of generating a request message by the communication device 1 serving as a client in the upper layer 100 which is the MAC layer or a higher layer.

[S101] and [S102]

The request message security processing unit 11 of the communication device 1 generates a random number and generates, as a temporary key, an output value of a one-way function that has received the common key shared with the communication device 2, the generated random umber, and an MAC address of the communication device 1 as an input.

[S103]

The request message security processing unit 11 generates an authentication code by using the generated temporary key while targeting at the random number and the MAC address, and sets the generated authentication code as request proof information.

[S104]

The request message security processing unit 11 generates a request message including the request proof information, the random number, and the MAC address. In addition, the request message security processing unit 11 encrypts a request proof information field assigned to the request message.

S105 to S108 in FIG. 5 represent a process performed in the physical layer. S105 and S106 represent acquisition of a request transmission time and assignment of the request transmission time to the request message. In addition, S107 and S108 represent generation of a request authentication tag and assignment of the request authentication tag to the request message.

[S105]

The secure request message generation unit 12 stands by until a transmission opportunity (transmission timing) to the communication device 2 comes and transitions to S106 when the transmission opportunity to the communication device 2 comes.

[S106]

The secure request message generation unit 12 acquires time of the transmission to the communication device 2 as a request transmission time and assigns the request transmission time to the encrypted and authenticated request message.

[S107] and [S108]

The secure request message generation unit 12 sets, as a request authentication tag, an output value of a one-way function that receives the request proof information and the request transmission time as an input, and assigns the request authentication tag to the request message. A time synchronization request message is generated to include the request message obtained as described above, and the time synchronization request message is transmitted to the communication device 2.

Figure 7:
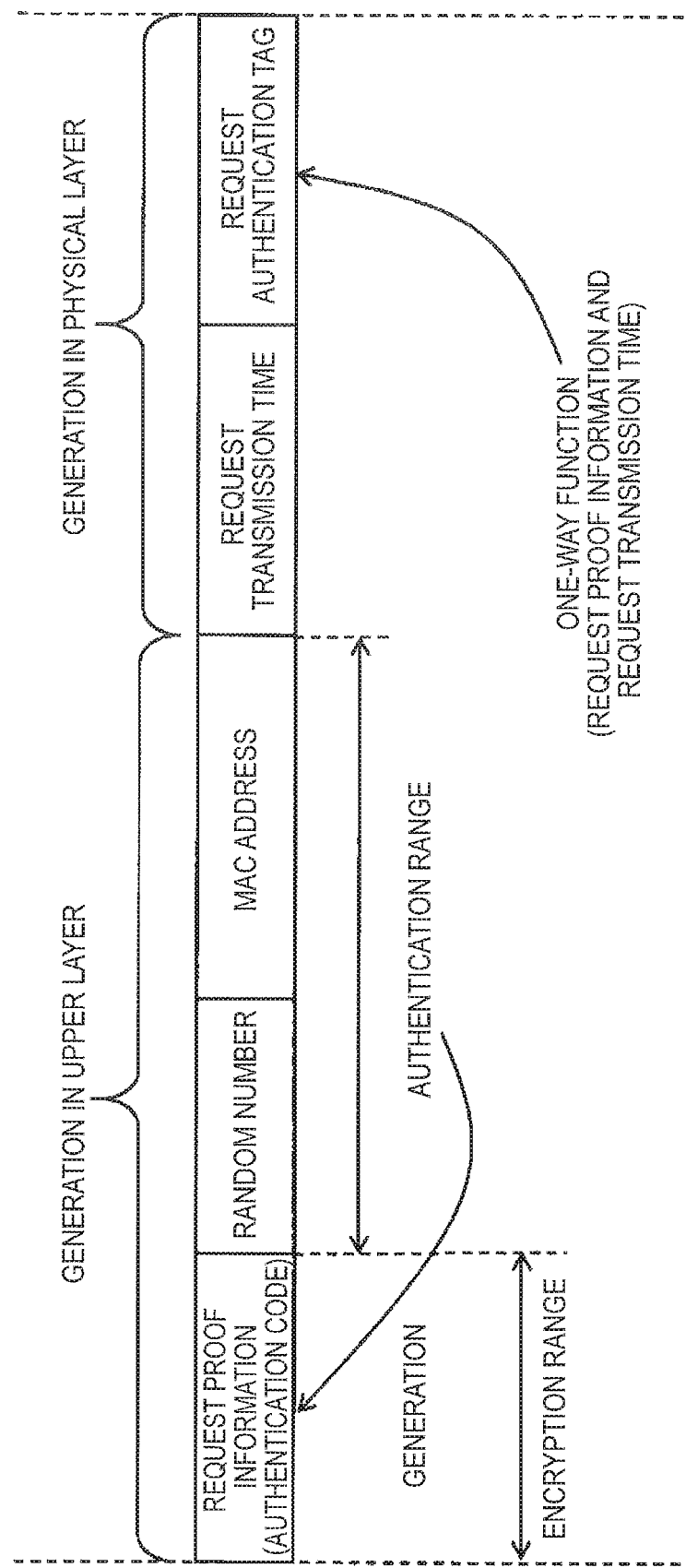
FIG. 7 is a configuration diagram illustrating an example of a configuration of a time synchronization request message according to an embodiment.

FIG. 7 is a configuration diagram illustrating an example of a configuration of the time synchronization request message according to the embodiment.

The time synchronization request message includes the request proof information, the random number, the MAC address, the request transmission time, and the request authentication tag as illustrated in FIG. 7. Among these elements constituting the time synchronization request message, the request proof information, the random number, and the MAC address are generated in the upper layer 100 which is the MAC layer or a higher layer, and the request transmission time and the request authentication tag are generated in the physical layer 110. In addition, the random number and the MAC address generated in the upper layer 100 constitute an authentication range, and the request proof information is encrypted. In the physical layer 110, when the transmission timing of the time synchronization request message comes, the time point thereof is assigned to the request message as a request transmission time, and further an output value of a one-way function that has received the request proof information and the request transmission time as an input is assigned to the request message as a the request authentication tag.

In FIGS. 5, S109 and S110 are processes performed in the physical layer 210 of the communication device 2 serving as a server, and represents acquisition of a request reception time.

[S109] and [S110]

Upon receiving the time synchronization request message, the request reception time acquisition unit 23 of the communication device 2 acquires the time at which the time synchronization request message is received as a request reception time.

S111 to S114 in FIG. 5 represent decryption and authentication of the request message and authentication of the request transmission time in the upper layer which is the MAC layer or a higher layer.

[S111]

The request message authentication unit 24 of the communication device 2 extracts the encrypted and authenticated request message from the time synchronization request message and thereby acquires the random number and the MAC address included in the request message. Then, an output value of a one-way function that has received the common key shared with the communication device 1 serving as a client, the random number, and the MAC address as an input is generated as a temporary key.

[S112] and [S113]

The request message authentication unit 24 decrypts the request proof information included in the request message using the generated temporary key. In addition, whether the output value (authentication code) of the one-way function that has received the random number and the MAC address included in the request message as an input matches the request proof information obtained from the decryption is checked. Then, in a case in which the output value (authentication code) matches the request proof information obtained from the decryption, the request proof information obtained from the decryption is authenticated as being valid information.

[S114]

The request transmission time authentication unit 25 extracts the request transmission time and the request authentication tag included in the request message. In addition, the request transmission time authentication unit 25 generates an authentication tag by inputting the request transmission time and the request proof information of which validity has been authenticated in S113 into the one-way function. Whether the obtained authentication tag matches the request authentication tag included in the request message is checked. Then, in the case in which the authentication tag matches the request authentication tag, the request transmission time included in the request message is authenticated as a valid time (valid information).

Next, creation of a response message by the communication device 2 and authentication of the response message by the communication device 1 will be described with reference to FIG. 6.

[S201] and [S202]

The response message security processing unit 21 of the communication device 2 generates a random number and generates, as a temporary key, an output value of a one-way function that has received the common key shared with the communication device 1, the generated random number, and an MAC address of the communication device 2 as an input.

[S203]

The response message security processing unit 21 generates an authentication code by using the generated temporary key while targeting at the request transmission time acquired in S114, the request reception time acquired in the physical layer 210 in S110, the generated random number, and the MAC address, and sets the generated authentication code as response proof information. That is, the authentication code obtained by inputting the request transmission time, the request reception time, the random number, and the MAC address into the one-way function is generated as response proof information.

[S204]

The response message security processing unit 21 generates a response message including the request transmission time, the request reception time, the response proof information, the random number, and the MAC address and encrypts the request transmission time, the request reception time, and the response proof information. Here, information to be encrypted may be at least the response proof information. That is, the request transmission time and the request reception time does not have to be encrypted.

[S205]

The secure response message generation unit 22 stands by until a transmission opportunity (transmission timing) to the communication device 1 comes, and transitions to S206 when the transmission opportunity to the communication device 1 comes.

[S206]

The secure response message generation unit 22 acquires a time at which transmission to the communication device 1 is performed as a response transmission time and assigns the response transmission time to the encrypted and authenticated response message.

[S207] and [S208]

The secure response message generation unit 22 sets, as a response authentication tag, an output value of the one-way function that has received the response proof information and the response transmission time assigned to the response message as an input, and assigns the response authentication tag to the response message. A time synchronization response message is generated to include response message obtained as described above, and the time synchronization response message is transmitted to the communication device 1.

Figure 8:
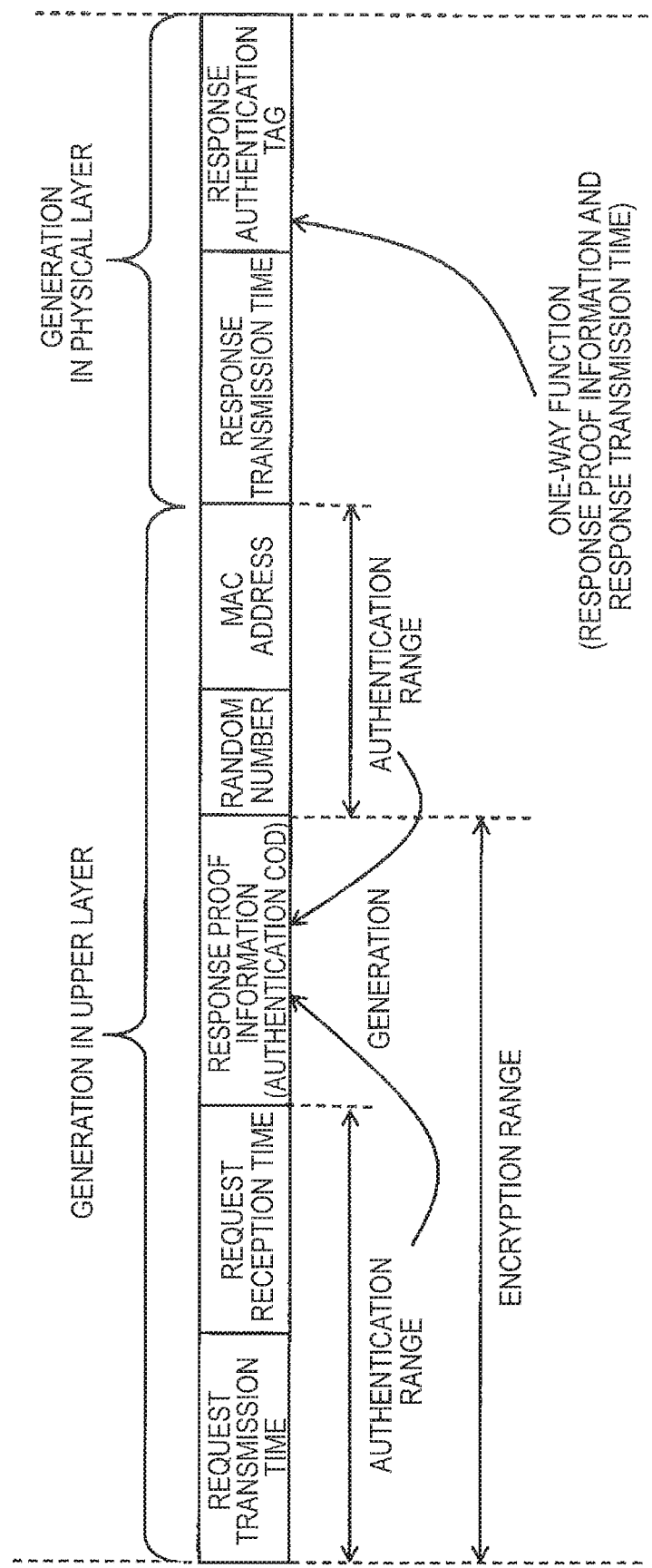
FIG. 8 is a configuration diagram illustrating an example of a configuration of a time synchronization response message according to an embodiment.

FIG. 8 is a configuration diagram illustrating an example of a configuration of a time synchronization response message according to an embodiment.

The time synchronization response message includes a request transmission time, a request reception time, response proof information, a random number, an MAC address, a response transmission time, and a response authentication tag as illustrated in FIG. 8. Among these elements constituting the time synchronization response message, the request transmission time, the request reception time, the response proof information, the random number, and the MAC address are generated in the upper layer 200 which is the MAC layer or a higher layer, and the response transmission time and the response authentication tag are generated in the physical layer 210. In addition, the request transmission time, the request reception time, the random number, and the MAC address generated in the upper layer 200 constitute an authentication range, and the response proof information is generated based on them, and at least the response proof information is encrypted. In the physical layer 210, when a transmission timing of the time synchronization response message comes, a time point thereof is assigned to the response message as a response transmission time and further an output value of a one-way function that has received the response proof information and the response transmission time as an input is assigned to the response message as a response authentication tag.

Figure 6:
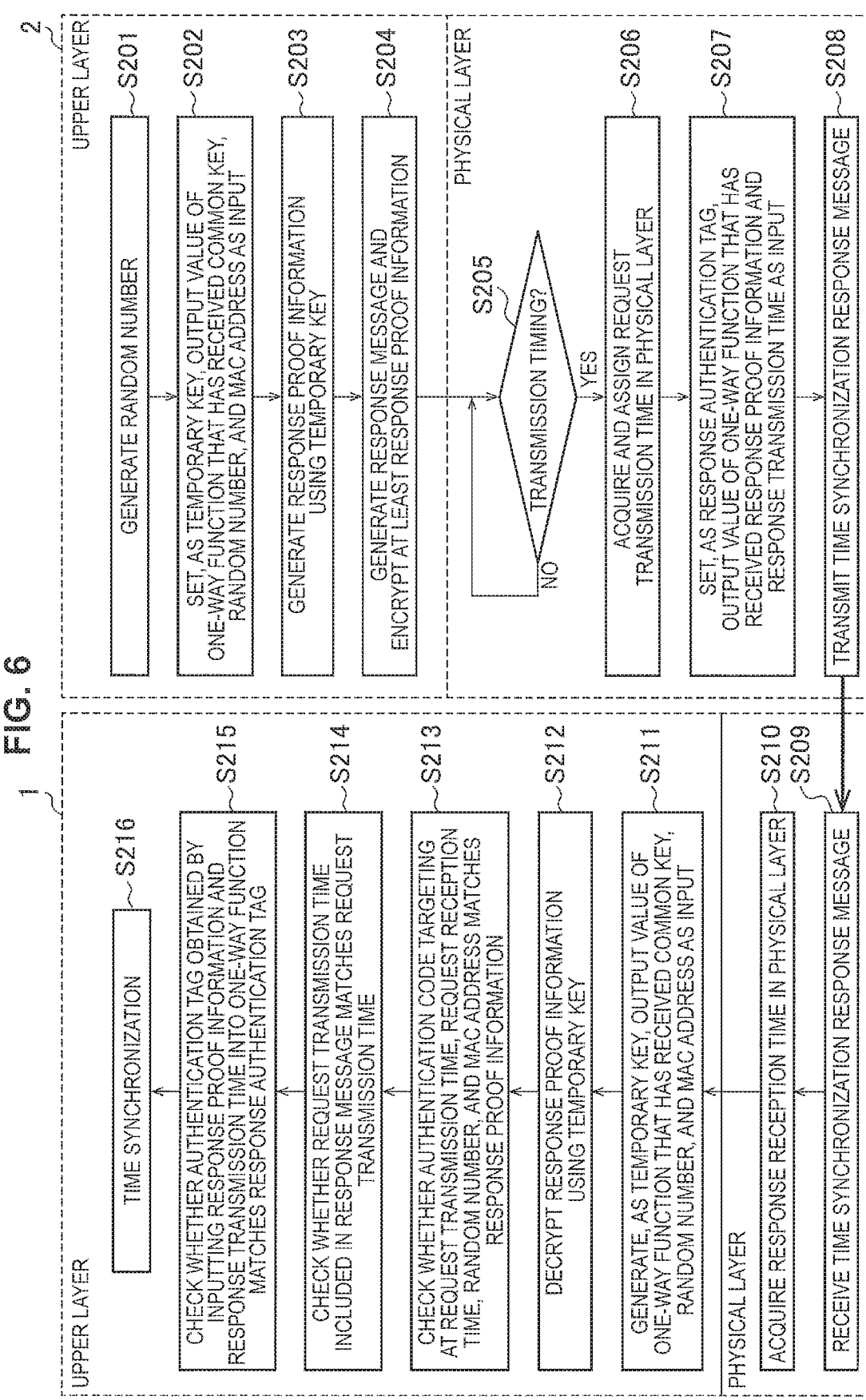
FIG. 6 is a flowchart illustrating a process relating to a response made by a communication device serving as a server to a communication device serving as a client with respect to a time synchronization request made by the communication device serving as the client according to an embodiment.

In FIGS. 6, S209 and S210 are processes performed by the communication device 1 serving as a client in the physical layer, and represent acquisition of a response reception time.

[S209] and [S210]

Upon receiving the time synchronization response message, the response reception time acquisition unit 13 of the communication device 1 acquires the time at which the time synchronization response message is received as a response reception time.

S211 to S215 in FIG. 6 represent decryption and authentication of the response message and authentication of the response transmission time by the communication device 1 serving as a client in the upper layer 100 which is the MAC layer or a higher layer.

[S211]

The response message authentication unit 14 extracts the encrypted and authenticated response message from the time synchronization response message and acquires the random number and the MAC address included in the response message. Then, the response message authentication unit 14 generates, as a temporary key, an output value obtained by inputting the common key shared with the communication device 2 serving as a server, the random number, and the MAC address into the one-way function.

[S212]

The response message authentication unit 14 cancels (decrypts) the encryption of the request transmission time, the request reception time, and the response proof information that are included in the encrypted and authenticated response message using the generated temporary key.

[S213]

The response message authentication unit 14 checks whether an authentication code generated while targeting at the request transmission time, the request reception time, the random number, and the MAC address acquired through the decryption process matches the response proof information included in the response message. Then, when it is ascertained that the generated authentication code matches the response proof information, the request transmission time, the request reception time, and the response proof information acquired through the decryption are authenticated as valid information.

[S214]

The response message authentication unit 14 checks whether the authenticated request transmission time (i.e., the request transmission time included in the time synchronization response message) matches the request transmission time acquired in S106 of FIG. 5 in order to check whether the time synchronization response message received by the communication device 1 is a formal response to the time synchronization request message transmitted by the own device (the communication device 1). Since the authenticated request transmission time matches the request transmission time acquired in S106 of FIG. 5, the received time synchronization response message is authenticated as a formal response to the time synchronization request message transmitted by the own device (the communication device 1).

[S215]

The response transmission time authentication unit 15 extracts the response transmission time and the response authentication tag included in the time synchronization response message. Then, the response transmission time authentication unit 15 checks whether an authentication tag obtained by inputting the response proof information and the extracted response transmission time into the one-way function matches the extracted response authentication tag, and authenticates the response transmission time as correct information in a case in which the tags match each other.

[S216]

The time synchronization unit 16 calculates a time deviation from that of the communication device 2 serving as a server by using the request transmission time acquired in S106 of FIG. 5, the response reception time acquired in S210, the request reception time successfully authenticated in S213, and the response transmission time successfully authenticated in S215, and thereby establishes time synchronization of the clock of the own device 1 (the communication device 1) by using the calculated time deviation.

(B-3) Effects of Embodiment

The embodiment is characterized in that, in the generation of a secure time synchronization message, most of security processes is executed in an upper layer (an upper layer which is the MAC layer or a higher layer), and the rest processes including assignment of a transmission time (a request transmission time or a response transmission time) to a time synchronization message and assignment of an authentication tag (a request authentication tag or a response authentication tag) of the assigned transmission time are executed in the physical layer as described above.

The secure time synchronization system according to the embodiment exhibits the following three effects.

(1) A time synchronization message is configured to be encrypted or authenticated using a secret key, and thus only a communication device knowing the key can generate the message. That is, falsification of a message and impersonation by a third party becomes difficult (e.g., since the proof information (the request proof information or the response proof information) that is one type of input information is encrypted to generate an authentication tag, only a device having decryption authority can generate a valid authentication tag).

(2) Since correspondence between a response message and a challenge message can be authenticated by executing challenge-response authentication, the system is not likely to subject to a replay attack. For example, the request transmission time assigned to the time synchronization request message transmitted from the communication device serving as a client to the communication device serving as a server is included in the time synchronization response message in an authenticatable form, the received response message can be validated as a formal response message to the challenge, not an invalid message replayed by an attacker.

(3) The security processes with respect to the time synchronization messages are configured to be executed in the upper layers (the MAC layer or higher layers) in view of protection of information other than the transmission times assigned in the physical layers, and processing delays occurring in the security processes performed in the physical layers can be reduced. For example, security arithmetic operations executed in the physical layers are processes only including light calculation of the one-way functions in comparison to the encryption and authentication code generation processes, and thus processing time for the security arithmetic operations to be executed in the physical layers can be reduced.

According to the present invention, security of the exchange of the time synchronization messages can be ensured while security processing delays in the physical layers can be reduced as described above, and therefore, a secure and highly precise time synchronization process can be realized.

(C) Other Embodiments

Although various modified embodiments have been mentioned in the description of the above-described embodiment, the present invention can be further applied to modified embodiments as exemplified below.

(C-1) Although the example of the secure time synchronization system according to the present invention in which the request message security processing unit or the response message security processing unit performs the security process using common key encryption has been described, the invention is not limited thereto. For example, a configuration in which a digital signature is applied instead of an authentication code is conceivable.

(C-2) With respect to the temporary key generated by the request message security processing unit or the response message security processing unit in the secure time synchronization system according to the present invention, different keys may be used for the outbound route from the communication device serving as a client to the communication device serving as a server and the inbound route from the communication device serving as a server to the communication device serving as a client, or the same key may be used while using, for example, the same information for the outbound and inbound routes as a random number or an MAC address.

(C-3) The configurations of the time synchronization request message (FIG. 7) and the time synchronization response message (FIG. 8) according to the present invention are merely examples, and the present invention is not limited thereto. For example, additional information such as a random number or the like may be included therein in addition to the information described above.

Heretofore, preferred embodiments of the present invention have been described in detail with reference to the appended drawings, but the present invention is not limited thereto. It should be understood that they will naturally come under the technical scope of the present invention.

What is claimed is:

1. A synchronization system in which a first communication device and a second communication device exchange time synchronization messages and the first communication device establishes synchronization with a time of the second communication device, wherein
    the first communication device includes
        a request message security processing unit configured to encrypt a request message including request proof information for proving validity of a request transmission time, and
        a secure request message generation unit configured to generate and transmit a time synchronization request message obtained by assigning a request transmission time and request authentication information for authenticating the request transmission time to the encrypted request message,
    the second communication device includes
        a request reception time acquisition unit configured to acquire a request reception time of the received time synchronization request message in a physical layer,
        a request message authentication unit configured to authenticate the request proof information obtained by decrypting the encrypted request message that is extracted from the received time synchronization request message,
        a request transmission time authentication unit configured to authenticate the request transmission time included in the time synchronization request message by checking whether authentication information generated on a basis of the authenticated request proof information and the request transmission time included in the time synchronization request message matches the request authentication information included in the time synchronization request message,
        a response message security processing unit configured to perform an encryption-authentication process on a response message including the request reception time and response proof information for proving validity of a time included in the response message, and
        a secure response message generation unit configured to generate and transmit a time synchronization response message obtained by assigning a response transmission time and response authentication information for authenticating validity of the response transmission time to the response message that has undergone the encryption-authentication process, and
    the first communication device further includes
        a response reception time acquisition unit configured to acquire a response reception time of the received time synchronization response message in a physical layer,
        a response message authentication unit configured to authenticate the response proof information obtained by decrypting the response message that has undergone the encryption-authentication process and that has been extracted from the received time synchronization response message,
        a response transmission time authentication unit configured to authenticate the response transmission time included in the time synchronization response message by checking whether authentication information generated on a basis of the authenticated response proof information and the response transmission time included in the time synchronization response message matches the response authentication information included in the time synchronization response message, and
        a time synchronization unit configured to establish synchronization with the time of the second communication device on a basis of the request transmission time, the request reception time, the response transmission time, and the response reception time.

2. The synchronization system according to claim 1, wherein the response message security processing unit performs an encryption-authentication process on the response message including the response proof information generated to include the authenticated request transmission time, and
    the response message authentication unit authenticates the validity of the response proof information and the request transmission time obtained from the time synchronization response message by checking whether the request transmission time obtained by decrypting the response proof information matches the request transmission time assigned to the time synchronization request message by the secure request message generation unit.

3. The synchronization system according to claim 1, wherein the request message security processing unit uses a temporary key generated by using key information and additional information in encryption of the request message and includes the additional information in the request message, and
    the request message authentication unit uses a temporary key generated by using key information and the additional information included in the encrypted request message in decryption of the request message.

4. The synchronization system according to claim 1, wherein the response message security processing unit uses a temporary key generated by using key information and additional information in the encryption-authentication process of the response message and performs the encryption-authentication process by including the additional information in the response message, and the response message authentication unit uses a temporary key generated by using key information and the additional information included in the encrypted and authenticated response message in decryption and an authentication process of the response message.

5. The synchronization system according to claim 3, wherein the additional information includes a random number.

6. The synchronization system according to claim 3, wherein the additional information includes unique address information of then own device.

7. The synchronization system according to claim 1, wherein generation of either of the request authentication information and the response authentication information uses a one-way function for which it is difficult to specify an input value from an output value.

8. A communication device that establishes synchronization with a time of a second communication device by transmitting a time synchronization message to the second communication device, the communication device comprising:
- a request message security processing unit configured to encrypt a request message including request proof information for proving validity of a request transmission time;
- a secure request message generation unit configured to generate and transmit a time synchronization request message obtained by assigning the request transmission time and request authentication information for authenticating the request transmission time to the encrypted request message;
- a response reception time acquisition unit configured to acquire a response reception time of a time synchronization response message received from the second communication device in a physical layer;
- a response message authentication unit configured to authenticate response proof information obtained by decrypting a response message that has undergone an encryption-authentication process and that has been extracted from the received time synchronization response message;
- a response transmission time authentication unit configured to authenticate a response transmission time included in the time synchronization response message by checking whether authentication information generated on a basis of the authenticated response proof information and the response transmission time included in the time synchronization response message matches response authentication information included in the time synchronization response message; and
- a time synchronization unit configured to establish synchronization with the time of the second communication device on a basis of the request transmission time, a request reception time, the response transmission time, and the response reception time.

9. The communication device according to claim 8, wherein the response message authentication unit authenticates validity of the response proof information and the request transmission time obtained from the time synchronization response message by checking whether the request transmission time obtained by decrypting the response proof information matches the request transmission time assigned to the time synchronization request message by the secure request message generation unit.

10. The communication device according to claim 8, wherein the request message authentication unit uses a temporary key generated by using key information and additional information included in the encrypted request message in decryption of the request message.

11. The communication device according to claim 8, wherein the response message authentication unit uses a temporary key generated by using key information and additional information included in the encrypted and authenticated response message in decryption and an authentication process of the response message.

12. The communication device according to claim 8, wherein generation of the request authentication information uses a one-way function for which it is difficult to specify an input value from an output value.

13. A communication device that transmits a time synchronization response message to a first communication device, in response to a time synchronization request message from the first communication device, the communication device comprising:
- a request reception time acquisition unit configured to acquire a request reception time of the time synchronization request message received from the first communication device in a physical layer,
- a request message authentication unit configured to authenticate request proof information obtained by decrypting an encrypted request message extracted from the received time synchronization request message;
- a request transmission time authentication unit configured to authenticate a request transmission time included in the time synchronization request message by checking whether authentication information generated on a basis of the authenticated request proof information and the request transmission time included in the time synchronization request message matches request authentication information included in the time synchronization request message;
- a response message security processing unit configured to perform an encryption-authentication process on a response message including the request reception time and response proof information for proving validity of a time included in the response message; and
- a secure response message generation unit configured to generate and transmit the time synchronization response message obtained by assigning a response transmission time and response authentication information for authenticating the response transmission time to the response message that has undergone the encryption-authentication process.

14. The communication device according to claim 13, wherein the response message security processing unit performs the encryption-authentication process on the response message including the response proof information generated to include the authenticated request transmission time.

15. The communication device according to claim 13, wherein the request message security processing unit uses a temporary key generated by using key information and additional information in the encryption of the request message and includes the additional information in the request message.

16. The communication device according to claim 13, wherein the response message security processing unit uses a temporary key generated by using key information and additional information in the encryption-authentication process of the response message and performs the encryption-authentication process by including the additional information in the response message.

17. The communication device according to claim 13, wherein generation of the response authentication information uses a one-way function for which it is difficult to specify an input value from an output value.

18. The communication device according to claim 10, wherein the additional information includes a random number.

19. The communication device according to claim 10, wherein the additional information includes unique address information of the own device.

* * * * *